United States Patent
Katoh et al.

(10) Patent No.: US 8,817,024 B2
(45) Date of Patent: Aug. 26, 2014

(54) DISPLAY DEVICE FOR INCREASING THE READABILITY OF AN INSTRUMENT IMAGE

(75) Inventors: Miki Katoh, Kariya (JP); Masahiro Kuno, Kariya (JP); Nagako Matsuno, Nagoya (JP); Akira Kamiya, Kuwana (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1246 days.

(21) Appl. No.: 12/056,491

(22) Filed: Mar. 27, 2008

(65) Prior Publication Data

US 2008/0238913 A1    Oct. 2, 2008

(30) Foreign Application Priority Data

Mar. 27, 2007 (JP) .................... 2007-82711
Jun. 7, 2007 (JP) .................... 2007-152074
Nov. 22, 2007 (JP) .................... 2007-303473

(51) Int. Cl.
*G06T 1/00* (2006.01)
(52) U.S. Cl.
USPC ........................... 345/421; 345/418
(58) Field of Classification Search
None
See application file for complete search history.

(56) References Cited

U.S. PATENT DOCUMENTS

| | | | |
|---|---|---|---|
| 6,710,774 B1 * | 3/2004 | Kawasaki et al. | 345/419 |
| 7,073,125 B1 * | 7/2006 | Nystrom et al. | 715/703 |
| 7,280,105 B2 * | 10/2007 | Cowperthwaite | 345/419 |
| 7,720,312 B2 | 5/2010 | Maier et al. | |
| 2002/0191860 A1 * | 12/2002 | Cheatle | 382/282 |
| 2004/0176880 A1 * | 9/2004 | Obradovich et al. | 701/1 |
| 2006/0092130 A1 * | 5/2006 | Choquet et al. | 345/156 |
| 2006/0185576 A1 * | 8/2006 | Tane | 116/288 |
| 2008/0100841 A1 * | 5/2008 | Han | 356/364 |

FOREIGN PATENT DOCUMENTS

| | | |
|---|---|---|
| DE | 103 60 896 | 7/2005 |
| JP | 8-240447 | 9/1996 |
| JP | 2004-314785 | 11/2004 |
| JP | 2005-49226 | 2/2005 |
| JP | 2006-21573 | 1/2006 |
| JP | 2007-278709 | 10/2007 |

OTHER PUBLICATIONS

Patrick Baudisch and Carl Gutwin. 2004. Multiblending: displaying overlapping windows simultaneously without the drawbacks of alpha blending. In Proceedings of the SIGCHI conference on Human factors in computing systems (CHI '04). ACM, New York, NY, USA.*
J. Diepstraten, D. Weiskopf, and T. Ertl, Transparency in Interactive Technical Illustrations Eurographics 2002 Conf. Proc., pp. 317-325, 2002.*

(Continued)

*Primary Examiner* — Daniel Hajnik
(74) *Attorney, Agent, or Firm* — Nixon & Vanderhye PC

(57) ABSTRACT

A display device includes a display panel for displaying an instrument image including an index image constituting an index and a pointer image constituting a pointer for pointing the index of the index image and a controller for displaying the instrument image on the display panel. The controller varies at least one of a pointer display mode of the pointer image and an index display mode of the index image so as to increase a readability of the index indicated by the index image when positions associated with the pointer image and the index image coincide.

12 Claims, 11 Drawing Sheets

(56) References Cited

OTHER PUBLICATIONS

I. Viola and M. E. Gröller: Smart visibility in visualization. In Proc. of Computational Aesthetics in Graphics, Visualization and Imaging, 2005.*

Anastasia Bezerianos, Pierre Dragicevic, and Ravin Balakrishnan. 2006. Mnemonic rendering: an image-based approach for exposing hidden changes in dynamic displays. In Proceedings of the 19th annual ACM symposium on User interface software and technology (UIST '06). ACM, New York, NY, USA, 159-168.*

Jens Kruger, Jens Schneider, Rudiger Westermann, ClearView: An Interactive Context Preserving Hotspot Visualization Technique, IEEE Transactions on Visualization and Computer Graphics, vol. 12, No. 5, Sep./Oct. 2006, pp. 941-948.*

Chris Coffin, Tobias Höllerer, Interactive Perspective Cut-away Views for General 3D Scenes, IEEE Symposium on 3D User Interfaces Mar. 25-26, 2006, Alexandria, Virginia, USA.*

German Office Action issued on Apr. 11, 2011, in corresponding German Application No. 10 2008 012 307.2-41 with English translation.

Japanese Office Action dated Jun. 16, 2009, issued in corresponding Japanese Application No. 2007-303473, with English translation.

* cited by examiner

DISPLAY DEVICE FOR INCREASING THE READABILITY OF AN INSTRUMENT IMAGE

CROSS REFERENCE TO RELATED APPLICATIONS

This application is based on Japanese Patent Applications No. 2007-82711 filed on Mar. 27, 2007, No. 2007-152074 filed on Jun. 7, 2007, and No. 2007-303473 filed on Nov. 22, 2007, the disclosures of which are incorporated herein by reference.

TECHNICAL FIELD

The present invention relates to a display device for displaying an instrument image including at least a pointer and an index.

BACKGROUND

JP2006-21573A discloses a display device that is provided with a display panel, such as a liquid crystal panel, in which a plurality of pixels are formed in a matrix shape. The display device is configured to display an instrument image including at least a pointer image constituting a pointer and an index image constituting an index to be pointed up by the pointer on the display panel. In a case where the instrument image is displayed in such a manner that the pointer image and the index image overlap, although not described clearly in JP2006-21573A, the readability of the index image is likely to reduce when overlapped with the pointer image.

SUMMARY

The exemplary embodiments are made in view of the foregoing problem and it is an object to provide a display device which is capable of increasing the readability of an index image when positions associated with the index image and a pointer image coincide.

According to an aspect of the present invention, a display device includes a display panel for displaying an instrument image including an index image constituting an index and a pointer image constituting a pointer for pointing the index and a controller for displaying the instrument image on the display panel. The controller varies at least one of a pointer display mode of the pointer image and an index display mode of the index image so as to increase a readability of the index indicated by the index image when positions associated with the pointer image and the index image coincide.

According to this construction, since at least one of the pointer display mode and the index display mode is varied when the positions associated with the pointer image and the index image coincide, such as when the index image is pointed by the pointer image, the readability of the index indicated by the index image increases.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereinafter, exemplary embodiments of the present invention will be described with reference to the accompanying drawings. In the second and seventh embodiments, components similar to those of the first embodiment will be indicated by the same numerals and will not be described further.

First Embodiment

Figure 1:
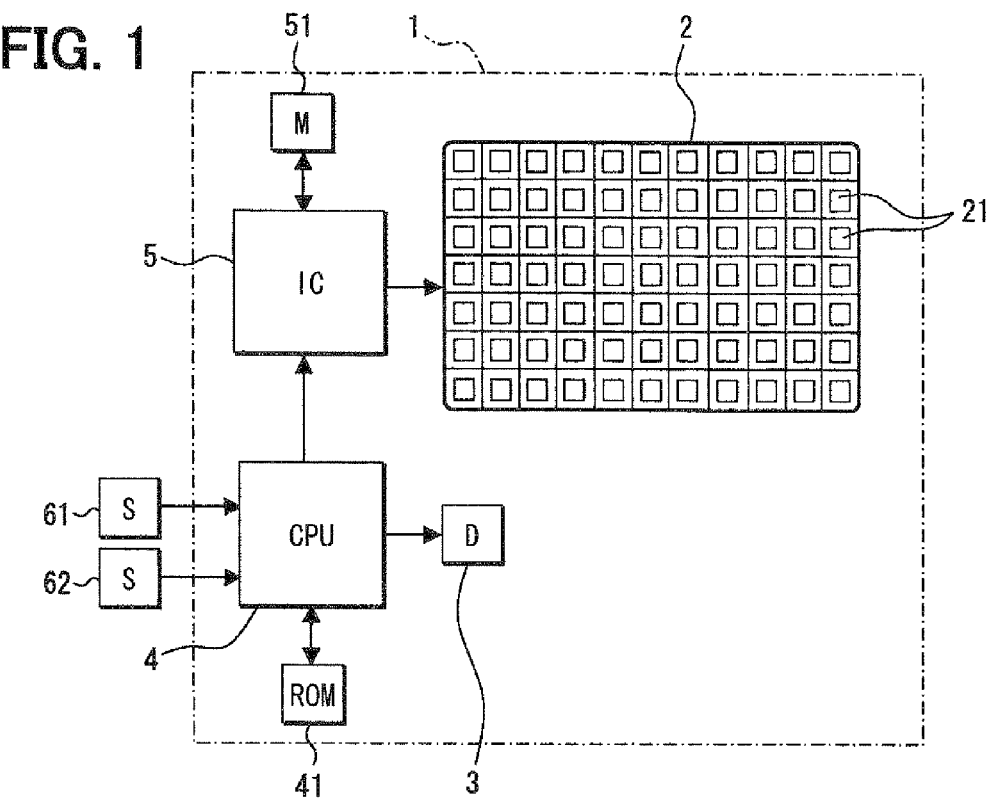
FIG. 1 is a circuit construction diagram of a display device according to a first embodiment of the present invention.

A display device 1 shown in FIG. 1 is used as, for example, a vehicular display device. The display device 1 is provided with a display panel 2, a light emitting diode 3, a CPU (central processing unit) 4 as a controller, a lithography IC (integral circuit) 5, a ROM (read only memory) 41 and an image memory 51 for rewriting memory data.

The display panel 2 is, for example, a liquid crystal panel 2 that is formed with a plurality of pixels 21 in a matrix shape. The liquid crystal panel 2 is, for example, a liquid crystal panel of an active matrix system driven by a thin film transistor (TFT) (not shown). In addition, each pixel 21 houses a red pixel, a green pixel and a blue pixel therein and a voltage is applied to a gate of TFT to control a voltage applied to the red pixel, the green pixel and the blue pixel in each pixel 21, thereby controlling an optical transmittance of each of the red pixel, the green pixel and the blue pixel in the pixel 21.

The light emitting diode 3 emits white light, for example, when turned on by the CPU 4. The light emitting diode 3 is disposed behind the liquid crystal panel 2 as a light source for transmitting the light toward the liquid crystal display panel 2 and thereby illuminating the liquid crystal panel 2. When the liquid crystal display panel 2 is illuminated by the light emitting diode 3 in a condition that the optical transmittances of the red pixel, the green pixel and the blue pixel of each of the pixels 21 are controlled, a full color display is made on the liquid crystal panel 2.

CPU 4 takes in signals from various sensors, such as a rotational sensor 61 and an indicator/warning sensor 62, and inputs the signals into the lithography IC 5. The rotational sensor 61 detects an engine rotation speed of a vehicle as a predetermined measured magnitude. The indicator/warning sensor 62 is provided for indicating an operating condition of a device equipped in the vehicle and/or warning of abnormality in the vehicle.

Image data for displaying images such as a rotation meter image 7 and a speed meter image 8 as instrument images and indicator/warning images 9, are stored in ROM 41. According to an instruction of CPU 4, the image data are transferred from ROM 41 to the image memory 51 and the lithography IC 5 controls a voltage applied to the red pixel, the green pixel and the blue pixel in each pixel 21 based upon the image data in the image memory 51 and the inputted predetermined measured magnitude or the indicator/warning information. In consequence, a display state of each of the plurality of the pixels 21 is controlled.

Figure 2:
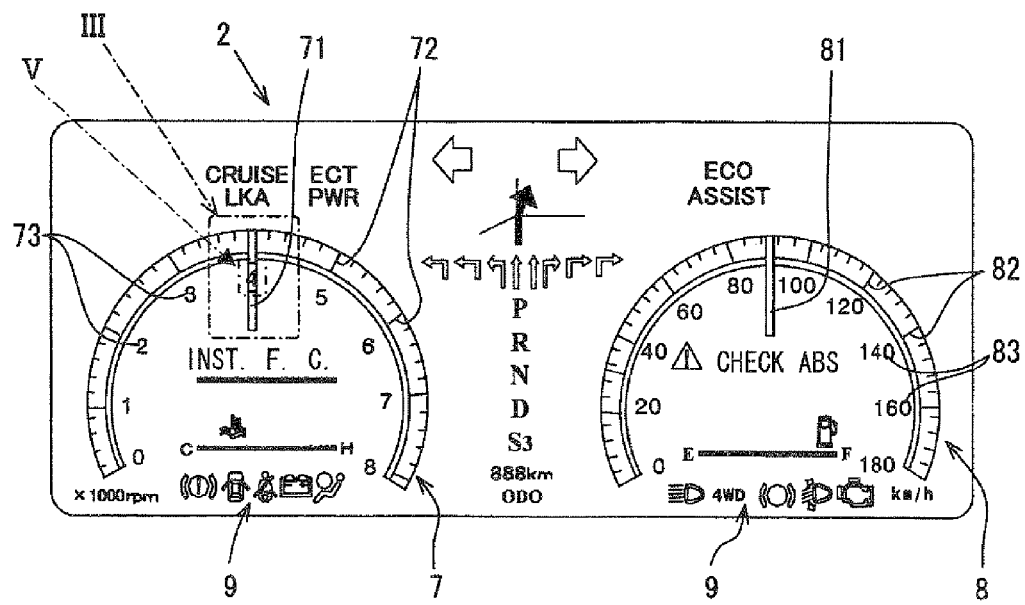
FIG. 2 is a front view of a liquid crystal panel of the display device according to the first embodiment.

In this way, as shown in FIG. 2, the rotation meter image 7, the speed meter image 8, the indicator/warning images 9 and the like are displayed on the liquid crystal panel 2. The rotation meter image 7 is an image which indicates a rotation meter showing an engine rotational speed of the vehicle and is provided with a pointer image 71, a scale image 72 and index images 73. The pointer image 71 indicates a pointer that is rotatable in response to increasing/decreasing of the engine rotational speed. The scale image 72 indicates a scale. The index images 73 indicate figures as indexes to be pointed up by the pointer.

In the present embodiment, when the pointer image 71 points up one of the figures of the index image 73, the pointer image 71 and the corresponding figure of the index image 73 are displayed so as to overlap with each other. Yet, to increase readability of the index image 73 in the overlap display, that is, when positions associated with the pointer image 71 and the index image 73 coincide, at least one of a pointer display mode of the pointer image 71 and an index display mode of the index display 73 is varied.

The speed meter image 8 is an image indicating a speed meter for displaying a speed of the vehicle as a predetermined measured magnitude. Similar to the rotation meter image 7, the speed meter image 8 is provided with a pointer image 81, a scale image 82 and index images 83. The pointer image 81 indicates a pointer rotating in response to increasing/decreasing of a speed of the vehicle. The scale image 82 indicates a scale. The index images 83 indicate figures as indexes to be pointed up by the pointer.

Similar to the display of the rotation meter image 7, when the pointer image 81 points up one of the index images 83, the pointer image 81 and the corresponding figure of the index image 83 are displayed so as to overlap with each other. Yet, to increase readability of the index image 83 in the overlap display, that is, when positions associated with the pointer image 81 and the index image 83 coincide, at least one of a pointer display mode of the pointer image 81 and an index display mode of the index display image 83 is varied. The indicator/warning images 9 include images indicating indicators, information (e.g., instant fuel consumption) and a warning (e.g., message "Check ABS! Please have dealer's inspection").

Hereinafter, examples of varying one of the pointer display mode and the index display mode will be described, in regard to the rotation meter image 7, as an example, with reference to FIGS. 3 and 4.

When the position associated with the pointer image 71 and the position associated with one of the index images 73 (e.g., figure "4" in FIG. 3) coincide, at least one of the pointer display mode and the index display mode is varied so as to increase the readability of the index (e.g., the figure "4") indicated by the index image 73. In addition, at least one of the pointer display mode and the index display mode is varied so as to show the pointer image 71 as continuous in a longitudinal direction (upward/downward direction in FIG. 3) at a position where the pointer image 71 and the index image 73 overlap. In other words, at least one of the pointer display mode and the index display mode is varied so as to increase the readability of the index while showing the pointer image as continuous through a portion of the pointer image associated with the positions where the pointer image and the index image coincide.

For example, when the positions associated with the index image 73 and the pointer image 71 coincide, the index image 73 is displayed to overlap over the pointer image 71, and a portion (peripheral portion) 71a of the pointer image 71, which is on a periphery of an overlap portion 73a where the pointer image 71 and the index image 73 overlap, is displayed with brightness that is different from any of brightness of a remaining portion of the pointer image 71, brightness of the index image 73 and brightness of a background 76 in both of the pointer image 71 and the index image 73. In this way, the pointer display mode is varied.

As an example, the index image 73 is displayed on the overlap portion 73a where the pointer image 71 and the index image 73 overlap, and the peripheral portion 71a is displayed with brightness between the brightness of the background 76 and the brightness of the remaining portion of the pointer image 71. For example, in a case where the remaining portion of the pointer image 71 and the index image 73 both are displayed in white color and the background 76 is black in color, the peripheral portion 71a is displayed in gray color having a substantially central brightness between the black background 76 and the white pointer image 71.

In this case, since the white index image 73 is displayed by using the gray peripheral portion 71a, which has the central brightness between the black background 76 and the white pointer image 71, as the background, the index image 73 overlapping with the pointer image 71 will be easily recognized, as compared to a case of displaying the white index image 73 by using the white pointer image 71 as the background. Therefore, the readability of the index, such as the figure "4" indicated by the index image 73 increases.

Further, as a result of displaying the peripheral portion 71a in gray color having the central brightness between the black background 76 and the white pointer image 71, the pointer image 71 can be shown without disconnection at the peripheral portion 71a. That is, since a continuous feeling is provided to the pointer image 71 at the peripheral portion 71a, the pointer image 7 is shown as continuous throughout its length.

Therefore, as compared to displaying the peripheral portion 71a in black color of the background 76 so as not to display the peripheral portion 71a, the readability of the pointer image 71 increases even when the pointer image 71 overlaps with the index image 73. As a result, the index image 73 overlapping with the pointer image 71 and the pointer image 71 overlapping with the index image 73 are easily recognized.

Accordingly, it becomes easy to recognize which index image 73 is pointed up by the pointer image 71 and it is possible to read the index, such as the figure "4" indicated by the index image 73 at the overlap position. Further, it is possible to point the index so as to be easily recognized and increase the readability of the pointed index.

Here, in a case of displaying the peripheral portion 71a with brightness that is close to the black background 76 (i.e., in a color close to black), it can be easy to recognize the white index image 73 overlapping with the white pointer image 71. However, the continuous feeling of the white pointer image 71 at the peripheral portion 71a deteriorates. Thus, it becomes difficult to recognize the pointer image 71 overlapping with the index image 73.

On the contrary, in a case of displaying the peripheral portion 71a with brightness close to the white pointer image 71 (i.e., in a color close to white), it is difficult to recognize the white index image 73 overlapping with the white pointer image 71. However, the continuous feeling of the white pointer image 71 at the peripheral portion 71a improves. Thus, it becomes easy to recognize the white pointer image 71 overlapping with the index image 73.

In this way, making it easy to recognize the index image 73 overlapping with the pointer image 71 and making it easy to recognize the pointer image 71 overlapping with the index image 73 are contradictory. On the other hand, because of displaying the peripheral portion 71a in gray color having the substantially central brightness between the black background 76 and the white pointer image 71, both of the above are compatible more appropriately.

Figure 4:
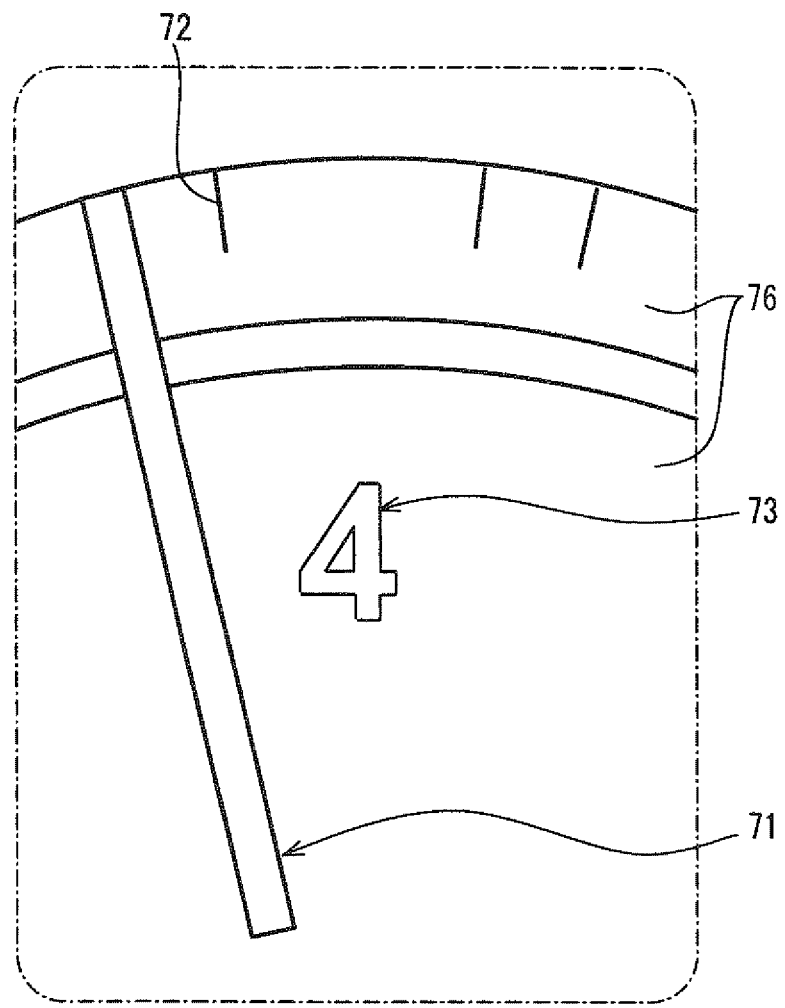
FIG. 4 is an enlarged front view of the part III when a rotational position of a pointer image is different from that of FIG. 3.

In a case where the pointer image 71 does not point up the index image 73, since the pointer image 71 and the index image 73 are not displayed to overlap with each other, the peripheral portion 71a and the overlap portion 73a are not formed, as shown in FIG. 4. That is, the index images 73, which are not pointed by the pointer image 71, that is, do not coincide with the pointer image 71, are shown ordinary.

Also in the speed meter image 8, at least one of the pointer display mode and the index display mode are varied in the similar manner, when positions associated with the index image 83 and the pointer image 81 coincide. Thus, the explanation of the varying of the pointer display mode and the index display mode of the speed meter image 81 is omitted.

In the present embodiment, the display device 1 includes the display panel 2, such as the liquid crystal display panel, for displaying the rotation meter image 7 as the instrument image including the pointer image 71 constituting the pointer and the index image 73 constituting the index pointed up by the pointer, and the controller, such as the CPU 4 and the lithography IC 5, for displaying an instrument image such as the rotation meter image 7 and/or the speed meter image 8 on the display panel 2 in such a manner as to provide an overlap display of displaying the pointer image 71, 81 and the index image 73, 83 to overlap with each other. The controller vary at least one of the pointer display mode of the pointer image 71, 81 and the index display mode of the index image 73, 83 so as to increase the readability of the index indicated by the index image 73, 83 at the time of the overlap display. Accordingly, it is possible to read the index indicated by the index image 73, 83 even when the index image 73, 83 and the pointer image 71, 81 are overlapped.

In the above example, the peripheral portion 71a is displayed in a uniform brightness. However, the display of the peripheral portion 71a is not limited to the above example. As another example, the peripheral portion 71a can be displayed in a gradation manner in which the brightness of the peripheral portion 71a gradually varies from the brightness of the remaining portion of the pointer image 71 to the brightness of the background 76 from both ends 71b and 71c of the peripheral portion 71a toward a center 73c of the overlap portion 73a in the longitudinal direction of the pointer image 71 (upward/downward direction in FIG. 3).

For example, in the gradation of the peripheral portion 71a, the brightness of the peripheral portion 71a gradually varies from the brightness of the white remaining portion of the pointer image 71 to the brightness of the black background 76, from the upper end 71b toward the center 73c according to an arrow G1. In addition, the brightness of the peripheral portion 71a gradually varies from the brightness of the white remaining portion of the pointer image 71 to the brightness of the black background 76 from the lower end 71c toward the center 73c according to an arrow G2.

Therefore, the continuous feeling of the pointer image 71 at the both ends 71b and 71c of the peripheral portion 71a improves. In consequence, the pointer image 71 overlapping with the index image 73 can be easily recognized and the index image 73 overlapping with the pointer image 71 can be easily recognized at the center 73c of the overlap portion 73a. Accordingly, the above effect can be obtained and also design properties can be enhanced by the gradation effect of the peripheral portion 71a.

Figure 3:
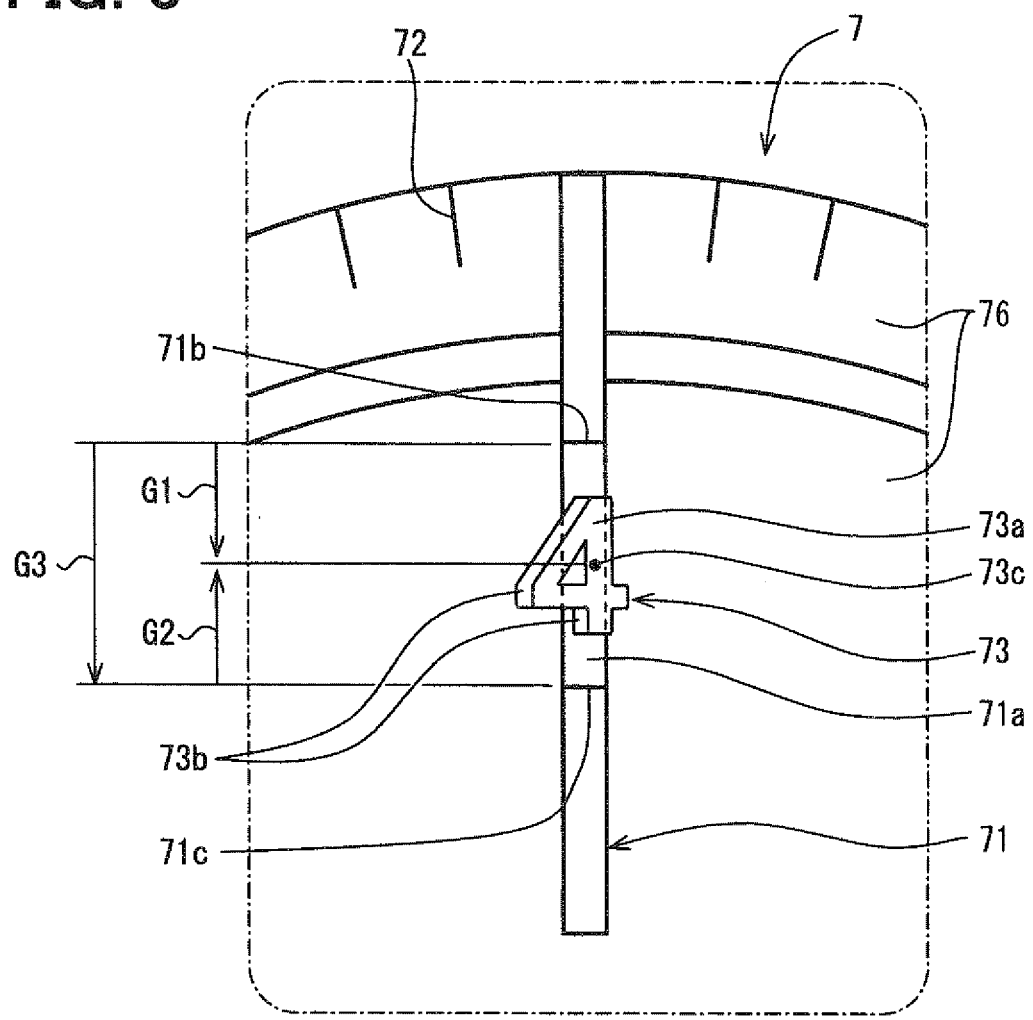
FIG. 3 is an enlarged front view of part III of the liquid crystal panel, denoted by a dashed chain line in FIG. 2.

As another example of the gradation of the peripheral portion 71a, the brightness of the peripheral portion 71a gradually varies from the brightness of the remaining portion of the pointer image 71 to the brightness of the background 76 from one of the ends 71b, 71c toward the other end in the longitudinal direction of the pointer image 71 (e.g., an up and down direction in FIG. 3). For example, the brightness of the peripheral portion 71a gradually varies from the brightness of the white remaining portion of the pointer image 71 to the brightness of the black background 76, from the upper end 71b toward the lower end 71c according to an arrow G3. Accordingly, the brightness rapidly varies from white color to black color at the lower end 71c.

Therefore, the continuous feeling of the pointer image 71 at the upper end 71b improves and in consequence, the pointer image 71 overlapping with the index image 73 can be easily recognized. In addition, since the brightness of the peripheral portion 71a in the lower end 71c is close to the brightness of the background 76, the index image 73 overlapping with the pointer image 71 in the lower end 71c can be easily recognized. Accordingly, the above effect can be obtained and also design properties can be enhanced by the gradation effect of the peripheral portion 71a.

In addition, a shade portion 73b indicating a shade of the index image 73 pointed by the pointer image 71 may be also displayed adjacent to the index image 73. In this case, the index image 73 overlapping with the pointer image 71 can be more easily recognized by being pointed by the pointer image 71.

Further, a difference in brightness between the index image 73 pointed up by the pointer image 71 and the background 76 may be set higher than a difference in brightness between the other index images 731 which are not pointed up by the pointer image 71, and the background 76. In this case, the index image 73 overlapping with the pointer image 71 can be more easily recognized by the pointing of the pointer image 71.

In the above examples, the pointer image 71, the index image 73 and the background 76 are displayed in white and black without having hue and color saturation. However, the displays of the pointer image 71, the index image 73, the background 76 and the like are not limited to the above examples. Since the full color display can be made on the liquid crystal panel 2, the pointer image 71, the index image 73, the background 76 and the like may be displayed with any combinations of brightness, hue and color saturation. For example, the aforementioned effect can be obtained also by displaying the peripheral portion 71a with hue between the hue of the background 76 and the hue of the remaining portion of the pointer image 71.

For example, in FIG. 3, in a case where the remaining portion of the pointer image 71 and the index image 73 are displayed in red color and the background 76 is displayed in purple color, the peripheral portion 71a is displayed in red purple color having a substantially central hue between the background 76 and the pointer image 71. In this case, since the red index image 73 is displayed by using the red purple peripheral portion 71a having the central hue between the purple background 76 and the red pointer image 71 as the background, the index image 73 overlapping with the pointer image 71 can be more easily recognized, as compared to a case of displaying the red index image 73 by using the red pointer image 71 as the background.

In addition, as a result of displaying the peripheral portion 71a in red purple color having the central hue between the black background 76 and the red remaining portion of the pointer image 71, the pointer image 71 can be shown without being disconnected at this peripheral portion 71a. Therefore, the pointer image 71 can have the continuous feeling at the peripheral portion 71a. As such, as compared to a case of displaying the peripheral portion 71a with the same hue as the purple background 76, the pointer image 71 overlapping with the index image 73 can be easily recognized. As a result, the index image 73 overlapping with the pointer image 71 and the pointer image 71 overlapping with the index image 73 can be easily recognized.

Second Embodiment

In the second embodiment, when the positions associated with the pointer image 71, 81 and the index image 73, 83 coincide, the index display mode is varied by displaying a supplementary image on a periphery of the index image 73, 83, pointed by the pointer image 71, 81, thereby increasing the readability of the index image 73, 83.

Figure 5:
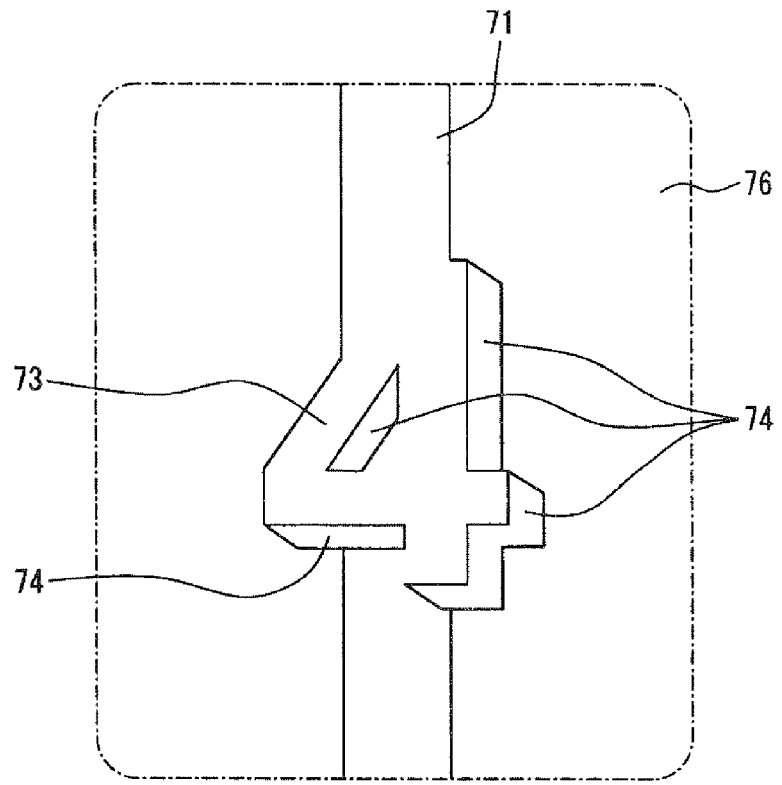
FIG. 5 is an enlarged front view of a part of a liquid crystal display panel of a display device according to a second embodiment of the present invention, the part corresponding to a part V of the display device of FIG. 2.

For example, as shown in FIG. 5, when the position of the pointer image 71 and the index image 73 coincide, a shade image 74 is displayed on the periphery of the index of the index image 73 pointed by the pointer image 71, as a supplementary image for increasing the readability of the index image 71, that is, for enhancing identification of the overlapped index image 73 relative to the pointer image 71. The shade image 74 is an image indicating a shade of the index image 73, and the shade image 74 is displayed with brightness between the brightness of the pointer image 71 and the brightness of the background 76 of both of the pointer image 71 and the index image 73. For example, the shade image 74 is displayed with a substantially central brightness between the brightness of the pointer image 71 and the brightness of the background 76.

As an example, in a case where the pointer image 71 and the index image 73 both are displayed in white color and the background 76 is black in color, the shade image 74 is displayed in gray color having the substantially central brightness between the black background 76 and the white pointer image 71.

By displaying the shade image 74 on the periphery of the index image 73, the index image 73 can be easily identified when the pointer image 71 overlaps with the position of the index image 73. Therefore, the readability of the index, such as the figure "4" index indicated by the index image 73 increases.

Figure 6:
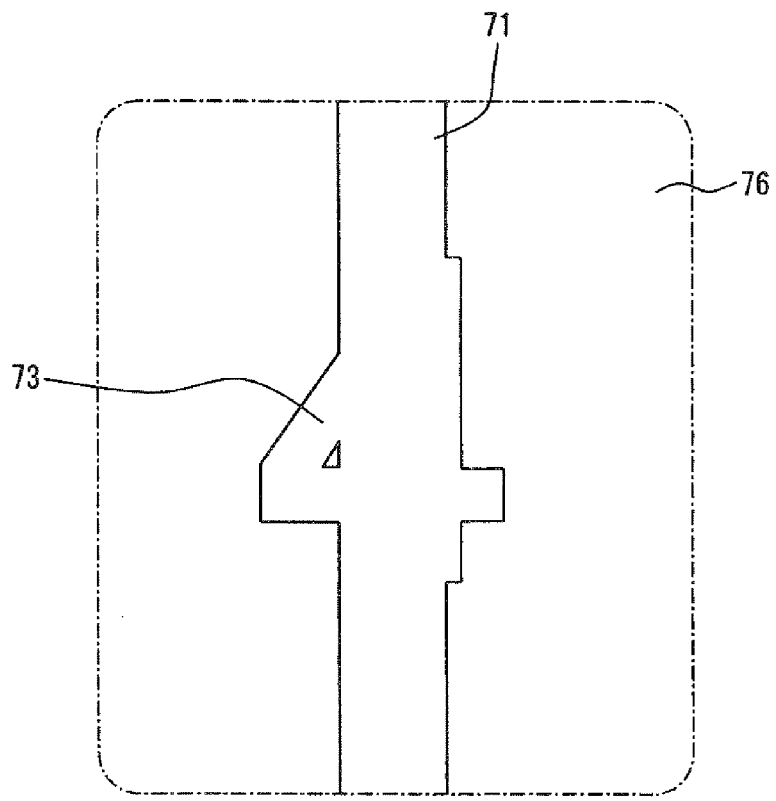
FIG. 6 is an enlarged front view showing a comparative example of FIG. 5.

On the other hand, in a comparative example where the shade image 74 is not displayed as shown in FIG. 6, it is difficult to identify the index image 73 relative to the pointer image 71 when the pointer image 71 overlaps with the index image 73. Thus, it is difficult to read the index, such as the figure "4", indicated by the index image 73.

In the present embodiment shown in FIG. 5, since the identification of the index image 73 relative to the pointer image 71 is enhanced by the shade image 74 indicating the shade of the index image 73, a stereoscopic effect can be given to the index image in addition to the aforementioned effect. Since this stereoscopic effect enhances an impression of the index image 73, the identification of the index image 73 can be enhanced. Accordingly, the readability of the index, such as the figure "4", indicated by the index image 73 further increases.

In addition, the shade image 74 is on the periphery of the index image 73 with the brightness between the brightness of the pointer image 71 and the brightness of the background 76, such as the substantially central brightness between the brightness of the pointer image 71 and the brightness of the background 76. Therefore, the index image 73 can be identified in both of the pointer image 71 and the background 76. As such, it is possible to form the shade image 74 in both of the pointer image 71 and the background 76. As such, it is possible to form the shade image 74 in such a manner as to more enhance the identification of the index image 73 and as a result, the identification of the index image 73 can be further enhanced. Accordingly, the readability of the index, such as the figure "4", indicated by the index image 73 further increases.

In addition, since the readability of the index indicated by the index image 73 is increased by the supplementary image 74, it is possible to adopt a construction of without disconnecting the pointer image 71 with the index image 73. For example, when the pointer image 71 and the index image 73 are displayed in white cooler, since the readability of the index image 73 overlapping with the pointer image 71 is increased by the supplementary image 74, the pointer image 71 can be shown a continuous.

In consequence, it is easy to recognize which index image 73 is pointed up by the pointer image 71 and it is possible to read the index, such as the figure "4", indicated by the index image 73 at this overlap position. That is, the readability of the index image 73 overlapping with the pointer image 71 increases.

In a case where the pointer image 71 does not point up the index image 73, since the pointer image 71 and the index image 73 are not displayed to overlap with each other, the shade image 74 is not displayed.

In addition, since the index display mode is varied in the speed meter image 8, in the similar manner as that of the rotation meter image 7. Thus, an explanation of the varying of the index display mode of the speed meter image 8 is omitted.

Figure 7:
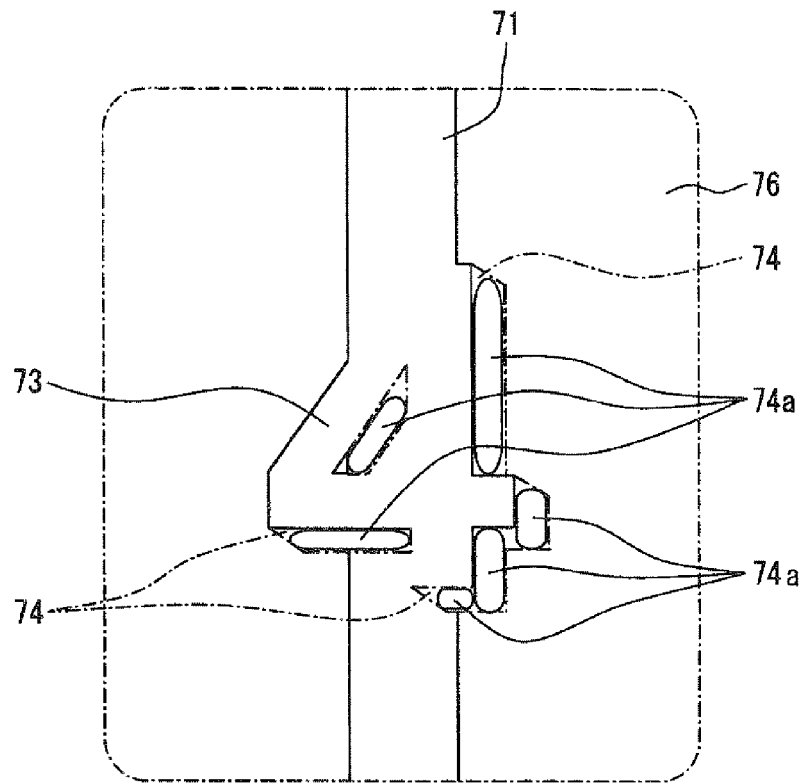
FIG. 7 is an enlarged front view showing a first modification of FIG. 5.

In the example shown in FIG. 5, the shade image 74 has an accurate shape. However, the supplementary image can be made by a shade image 74a having a schematic shape as shown in FIG. 7. For example, the shade image 74a has an elongated circle shape on the periphery of the index image 73. It should be noted that, for showing a corresponding relation between the shade image 74a and the shade image 74, the shade image 74 is shown in a dashed chain line in FIG. 7. The aforementioned effect can be obtained even by the schematic shade image 74a.

Figure 8:
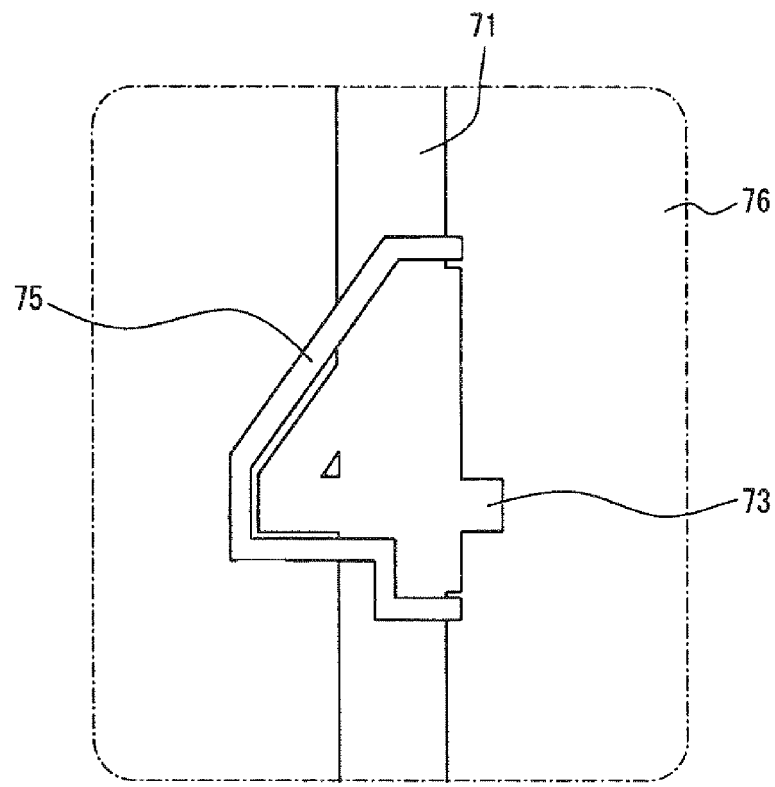
FIG. 8 is an enlarged front view showing a second modification of FIG. 5.

In the examples shown in FIGS. 5 and 7, the shade images 74, 74a are displayed on the periphery of the index image 73. Alternatively, the supplementary image can be provided by an outline image 75 as shown in FIG. 8, instead of the shade images 74, 74a. The outline image 75 is displayed on a periphery of the index image 73 overlapping with the pointer image 71, and is an image indicating at least a part of the outline of the index image 73.

Figure 9:
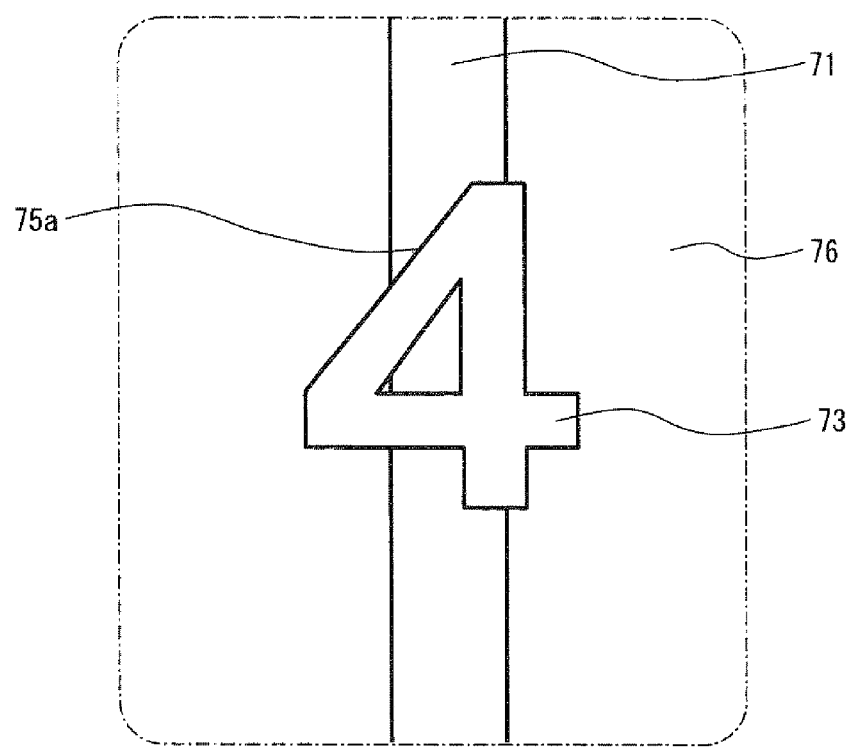
FIG. 9 is an enlarged front view showing a third modification of FIG. 5.

Since the identification of the index image 73 relative to the pointer image 71 is enhanced by the outline image 75, the outline of the index image 73 can be more certainly recognized. In consequence, the identification of the index image 73 can be enhanced, and thus the aforementioned effect can be obtained. Instead of the outline image 75, an outline image 75a indicating an entire outline of the index image 73 may be displayed, as shown in FIG. 9.

In the above examples of the present embodiment, the supplementary images 74, 74a, 75, 75a are displayed with the brightness between the bright ness of the pointer image 71 and the brightness of the background 76. For example, the supplementary images 74, 74a, 75, 75a are displayed with the substantially central brightness between the brightness of the pointer image 71 and the brightness of the background 76. As another example, the supplementary images 74, 74a, 75, and 75a can be displayed with the same brightness as that of the background 76.

Figure 10:
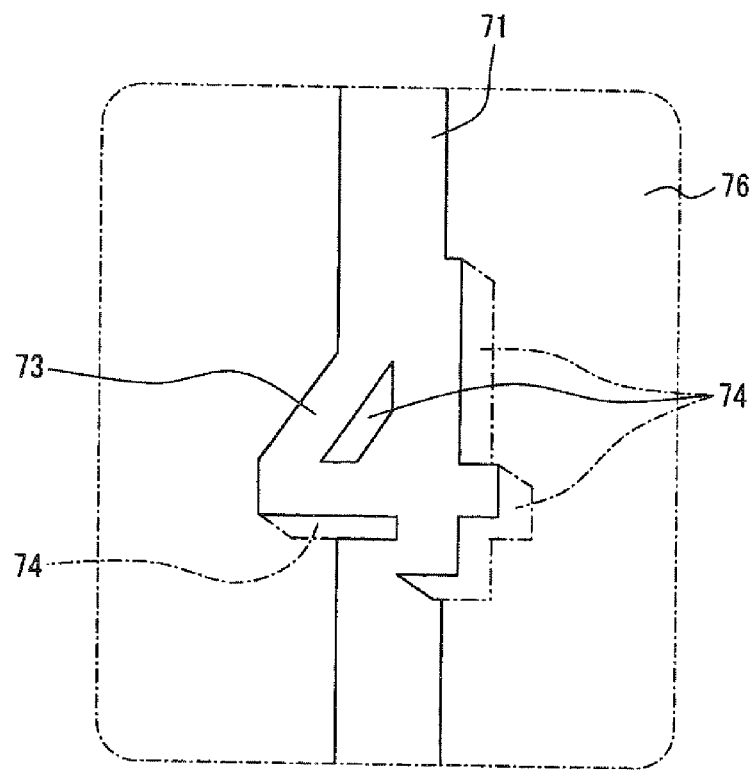
FIG. 10 is an enlarged front view showing a fourth modification of FIG. 5.

For example, as shown in FIG. 10, the shade image 74 may be displayed with the same brightness as that of the background 76. In FIG. 10, since the shade image 74 can not be identified in the background 76, a boundary line between the shade image 74 and the background 76 is shown in a dashed chain line for convenience. Also in this case, the index image 73 can be identified relative to the pointer image 71. Therefore, it is possible to read the index, such as the figure "4" indicated by the index image 73.

Figure 11:
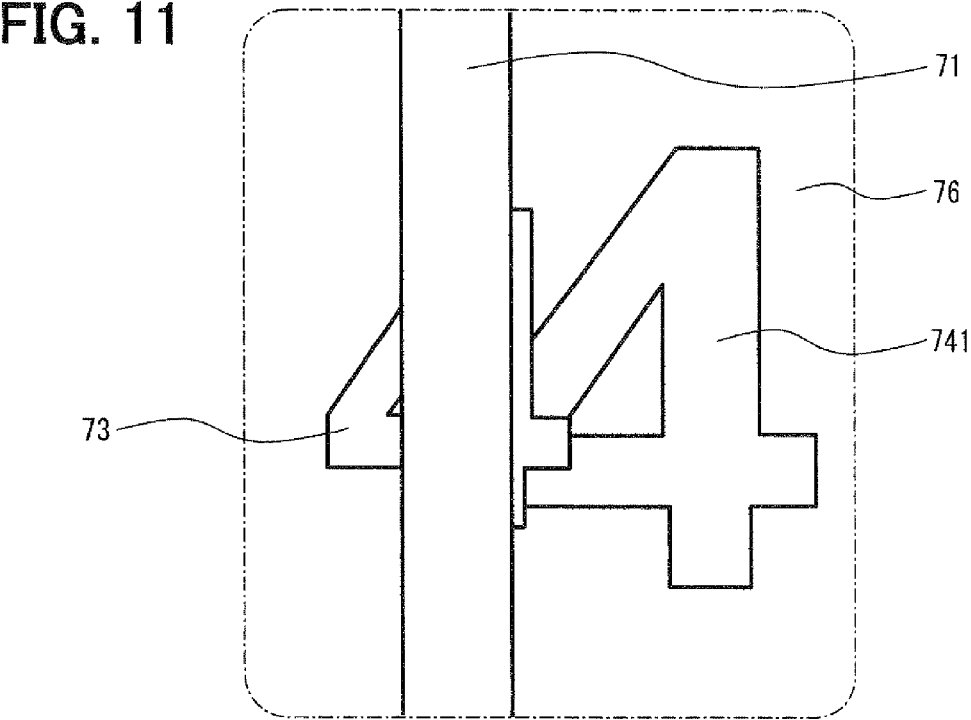
FIG. 11 is an enlarged front view showing a fifth modification of FIG. 5.

In the above examples of the present embodiment, the readability of the index image 73 pointed by the pointer image 71 is increased by the shade images 74 and 74a and the outline images 75 and 75a. As another example of the supplementary image, a supplementary index image 741 may be displayed, as shown in FIG. 11. The supplementary index image 741 indicating the index, such as the figure "4", indicated by the index image 73 is displayed at a position shifted in a direction in which the pointer image 71 moves (right-left direction in FIG. 11) from the index image 73 overlapping with the pointer image 71.

For example, in a case where the pointer image 71 moves to the right side in FIG. 11, the supplementary index image 741 is displayed at the position shifted to the right side from the index image 73. On the other hand, in a case where the pointer image 71 moves to the left side in FIG. 11, the supplementary index image 741 is displayed at the position shifted to the left side from the index image 73.

As another example, the supplementary index image 741 can be displayed at a position shifted in a direction opposite to the moving direction of the pointer image 71. For example, in a case where the pointer image 71 moves to the right side in FIG. 11 the supplementary index image 741 can be displayed at the position shifted to the left side from the index image 73. On the other hand, in a case where the pointer image 71 moves to the left side in FIG. 11, the supplementary index image 741 can be displayed at the position shifted to the right side from the index image 73.

In these cases, since the supplementary index image 741 indicates the index at the position shifted from the index image 73 according to the movement of the pointer image 71, it is possible to read the index, such as the figure "4", indicated by the index image 73. In addition, since the index indicated by the index image 73 overlapping with the pointer image 71 is shown by the supplementary index image 741, it is possible to adopt the construction of not disconnecting the pointer image 71 by the index image 73. That is, the pointer image 71 can be shown as continuous. That is, as shown in FIG. 11, it is possible to adopt the construction where the pointer image 71 is displayed to overlap over the index image 73. This construction enables the pointer image 71 to be shown as continuous.

In the above examples of the present embodiment, the pointer image 71, the index image 73, the background 76 and the supplementary images 74, 74a, 75, 75 are displayed in black and white without having the hue and the color saturation. However, the displays of the pointer image 71, the index image 73, the background 76 and the supplementary images 74, 74a, 75, 75a are not limited to the above. Since the full color display can be made on the liquid crystal panel 2, the pointer image 71, the index image 73, the background 76 and the supplementary images 74, 74a, 75, 75a may be displayed with any combinations of the brightness, the hue and the color saturation. For example, the supplementary images 74, 74a, 75, 75a can be displayed with a hue between the hue of the pointer image 71 and the hue of the background 76. The supplementary images 74, 74a, 75, 75a can be displayed with a substantially central hue between the hue of the pointer image 71 and the hue of the background 76. Also in these cases, the aforementioned effects can be obtained.

For example, in a case where the pointer image 71 and the index image 73 both are displayed in red color and the background 76 is displayed in purple color in FIG. 5, the shade image 74 is displayed in red purple color having a central hue between the hue of the background 76 and the hue of the pointer image 71. In this case, since the shade image 74 can be identified in both of the pointer image 71 and the background 76, it is possible to form the shade image 74 in the both. Therefore, it is possible to form the shade image 74 in such a manner as to further enhance the identification of the index image 73. As a result, the identification of the index image 73 can be further enhanced. As such, the readability of the index, such as the figure "4" indicated by the index image 73 overlapping with the pointer image 71 increases.

Third Embodiment

In the third embodiment, when the positions associated with the pointer image 71 and the index image 73 pointed by the pointer image 71 coincide, the index display mode is varied by displaying the overlap portion 73a where the pointer image 71 and the index image 73 overlap with each other with brightness different from any of the brightness of the pointer image 71 and the brightness of the index image 73.

Figure 12:
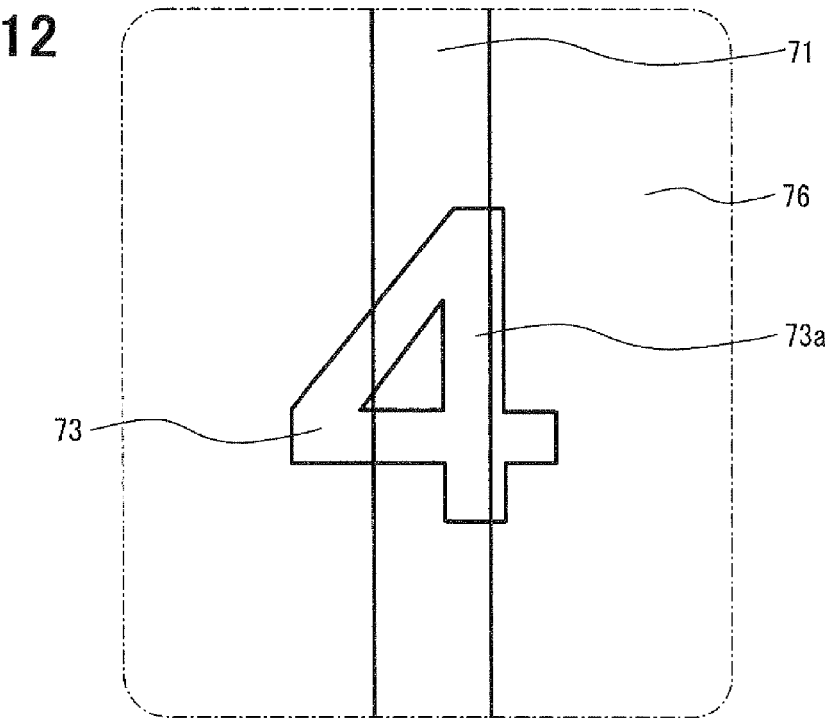
FIG. 12 is an enlarged front view of a part of a liquid crystal display panel of a display device according to a third embodiment of the present invention.

For example, as shown in FIG. 12, in a case where the pointer image 71 and the index image 73 both are displayed in white color and the background 76 is black in color, the overlap portion 73a is displayed in gray color having a substantially central brightness between the black background 76 and the white pointer and index images 71, 73.

In consequence, for example, as compared to a case where the overlap portion 73a is displayed in the same white color as the pointer image 71 and the index image 73, since the overlap portion 73a is displayed in gray color different from the color of the pointer image 71 and the index image 73, it is easy to read the index, such as the figure "4". In addition, since the continuous feeling of the pointer image 71 is provided through the overlap portion 73a, it is possible to show the pointer image 71 so as to be continuous.

In the examples of the present embodiment, the pointer image 71, the index image 73, the overlap portion 73a and the background 76 are displayed in white and black without having hue and color saturation, but may be also displayed in color including the hue and the color saturation. For example, the overlap portion 73a can be displayed with a hue different from the hue of the pointer image 71, the hue of the index image 73 and the hue of the background 76.

Further, the above examples of the index display mode of the present embodiment can be also employed to the speed meter image 8.

Fourth Embodiment

Figure 13:
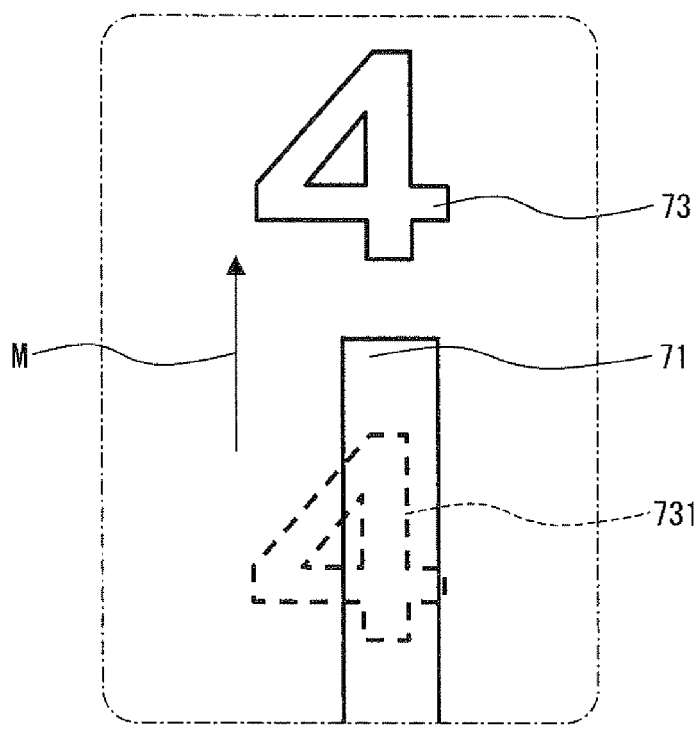
FIG. 13 is an enlarged front view of a part of a liquid crystal display panel of a display device according to a fourth embodiment of the present invention.

In the fourth embodiment, when the positions associated with the pointer image 71 and the index image 73 pointed by the pointer image 71 coincide, the index display mode is varied by moving the index image 73 from the ordinary position. For example, as shown in FIG. 13, the index display mode is varied by moving the index image 73 from an ordinary position, which is shown by a dashed line 731 in FIG. 13, to an outside of a tip end of the pointer image 71 in the longitudinal direction of the pointer image 71 as shown by an arrow M and displaying the index image 73 at the shifted position shown by a solid line in FIG. 13. On the other hand, when the index image 73 is not pointed by the pointer image 71, that is, when the position of the pointer image 71 does not coincide with the position of the index image 73, as shown in FIG. 14, the position of the index image 73 is moved to the ordinary position shown by a solid line in FIG. 14 from the shifted position shown by a dashed line 731 in FIG. 14.

Figure 14:
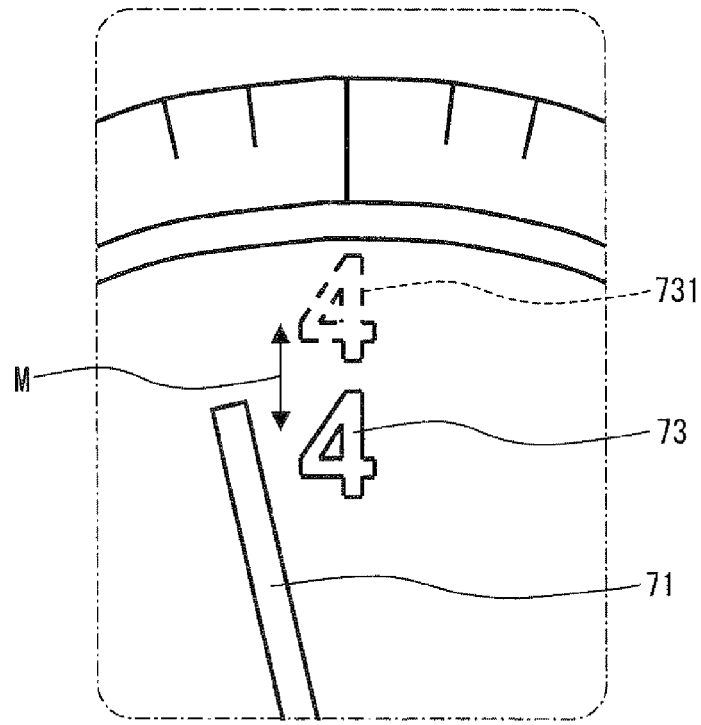
FIG. 14 is an enlarged front view when a rotational position of a pointer image is different from that of FIG. 13.

That is, when the index image 73 is not pointed by the pointer image 71, the index image 73 is displayed at the position shown by the solid line in FIG. 14, and when the position of the pointer image 71 coincides with the position of the index image 73, the index image 73 is displayed at the position shown by the dashed line 731 in FIG. 14. As such, the position of the index image 73 to be pointed by the pointer image 71 is displaced in a direction M of FIG. 14 according to the position of the pointer image 71.

In the present embodiment, when the positions associated with the pointer image 71 and the index image 73 coincide, the index image 73 is displayed at the position moved to the outside of the tip end of the pointer image 71. Therefore, it is possible to read the index, such as the figure "4", indicated by the index image 73 without interrupt of the pointer image 71. Further, the pointer image 71 can be shown so as to be continuous without disconnection by the index image 73.

Further, the above examples of the index display mode of the present embodiment can be also employed to the speed meter image 8.

Fifth Embodiment

Figure 15:
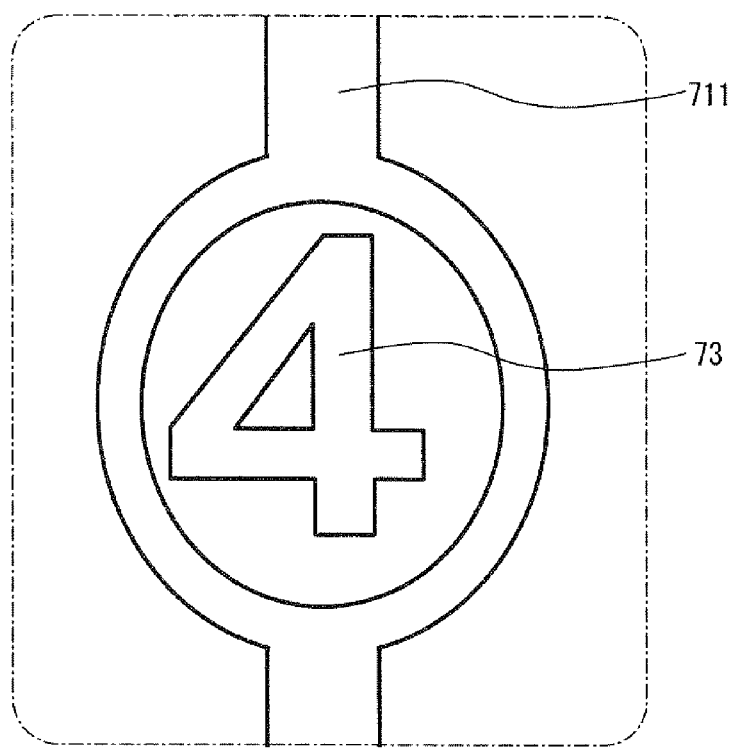
FIG. 15 is an enlarged front view of a part of a liquid crystal display panel of a display device according to a fifth embodiment of the present invention.

In the fifth embodiment, at the time of the overlap display of the pointer image 71 and the index image 73, that is, when the positions associated with the pointer image 71 and the index image 73 coincide, the pointer display mode is varied by changing a shape of the pointer image 71. For example, as shown in FIG. 15, the pointer image 71 is displayed in a bypassing shape 711 for bypassing or wrapping the index image 73. Further, the shape of the pointer image 71 is not limited to the shape 711 shown in FIG. 15.

In the present embodiment, when the position of the pointer image 711 coincides with the position of the index image 73, the pointer image 71 is displayed in the shape that bypasses or wraps the index, such as the figure "4", of the index image 73. Therefore, the index of the index image 73 can be shown without being interrupted by the pointer image 71. Further, the pointer image 71 can be shown as continuous. Accordingly, the readability of the index image 73 increases.

Further, the above examples of the pointer display mode of the present embodiment can be also employed to the speed meter image 8.

Sixth Embodiment

Figure 16:
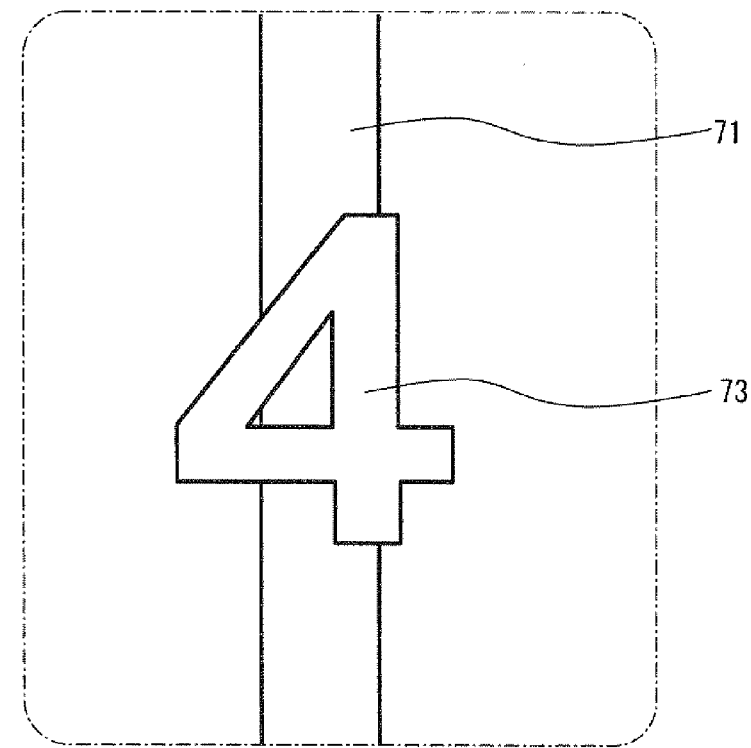
FIG. 16 is an enlarged front view of a part of a liquid crystal display panel of a display device according to a sixth embodiment of the present invention.

In the sixth embodiment, at the time of the overlap display of the pointer image 71 and the index image 73, that is, when the positions associated with the index image 73 and the pointer image 71 coincide, the index display mode is varied by displaying the entirety of the index image 73 overlapping with the pointer image 71 with brightness different from the brightness of the pointer image 71, as shown in FIG. 16.

For example, when the positions of the pointer image 71 and the index image 73 do not coincide, that is, when the pointer image 71 and the index image 73 do not overlap, the pointer image 71 and the index image 73 both are displayed in white color and the background 76 is black in color. In this case, when the position associated with the pointer image 71 coincides with the position associated with the index image 73, the entirety of the index image 73 overlapping with the pointer image 71 is displayed in gray color different from white color of the pointer image 71. Therefore, it is possible to read the index, such as the figure "4", indicated by the index image 73. That is, the readability of the index of the index image 73 increases.

In the present embodiment, since the entirety of the index image 73 overlapping with the pointer image 71 is displayed with the brightness different from the brightness of the pointer image 71, it is possible to read a figure "4" of the index indicated by the index image 73. As such, the readability of the index of the index image 73 increases. Further, it is not necessary to adopt the construction of disconnecting the pointer image 71 for being capable of reading the index indicated by the index image 73. Therefore, the pointer image 71 can be shown so as to be continuous.

Figure 17:
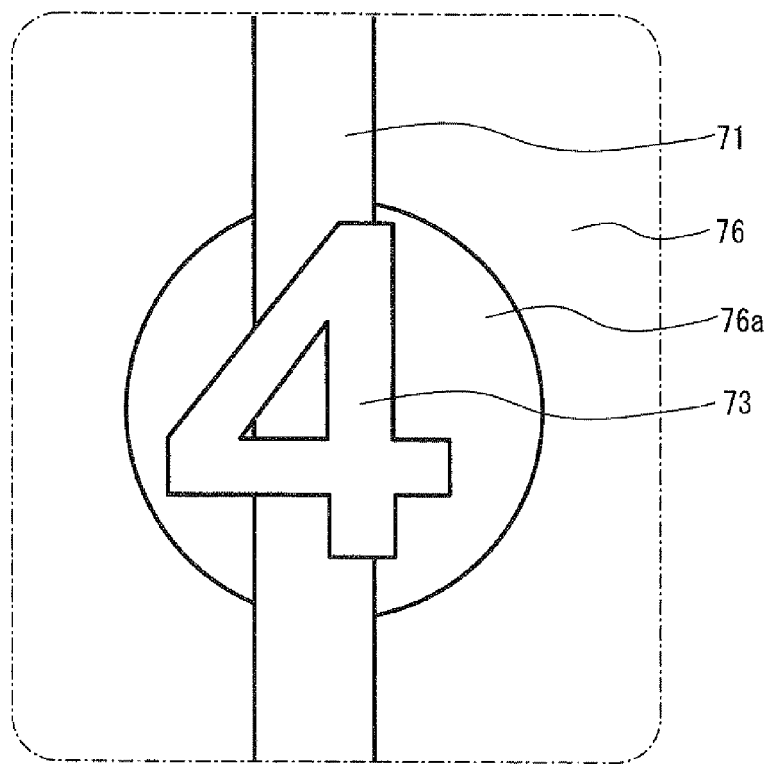
FIG. 17 is an enlarged front view showing a modification of FIG. 16.

In addition, as shown in FIG. 17, a background peripheral portion 76a of an entire periphery of the index image 73 overlapping with the pointer image 71 may be displayed with brightness different from the brightness of the background 76, the bright ness of the pointer image 71 and the brightness of the index image 73 overlapping with the pointer image 71. For example, the background peripheral portion 76a can be displayed in gray color that is different from any of black color of the background 76, white color of the pointer image 71 and gray color of the entirety of the index image 73 overlapping with the pointer image 71. In this case, since the overlap display is emphasized by the background peripheral portion 76a, the readability of the index, such as the figure "4" of the indicated by the index image 73 further increases.

Further, the background peripheral portion 76a may be displayed in a gradation manner in which the brightness of the peripheral portion 76a gradually varies from the brightness of the index image 73 to the brightness of the background 76, from the index image 73 toward the background 76. Since the overlap display is further emphasized by the background peripheral portion 76a displayed in the gradation manner, the readability of the index, such as the figure "4" indicated by the index image 73 is further increased.

In the above examples of the present embodiment, the pointer image 71, the index image 73, the background peripheral portion 76a and the background 76 are displayed in white and black without having hue and color saturation. Alternatively, the pointer image 71, the index image 73, and the background peripheral portion 76a and the background 76 may be displayed in any cooler combinations including the hue and the color saturation.

Further, the above examples of the index display mode of the present embodiment can be also employed to the speed meter image 8.

Seventh Embodiment

Figure 18:
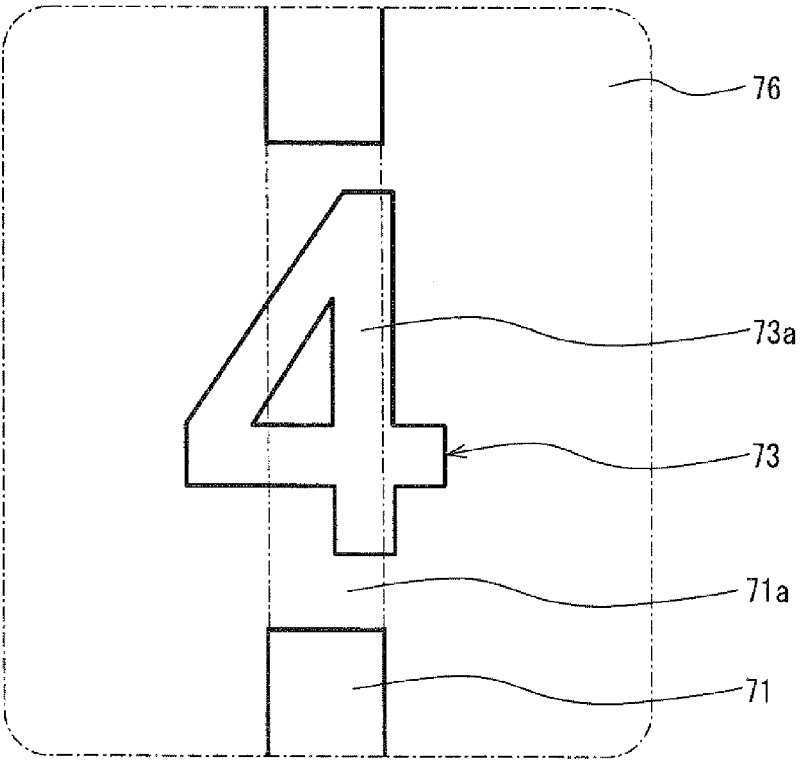
FIG. 18 is an enlarged front view of a part of a liquid crystal display panel of a display device according to a seventh embodiment of the present invention.

In the seventh embodiment, as shown in FIG. 18, at the time of the overlap display of the pointer image 71 and the index image 73, that is, when the positions associated with the index image 73 and the pointer image 71 coincide, the pointer display mode is varied. Specifically, the index image 73 is displayed to overlap with the pointer image 71 at the overlap portion 73a, and the portion (peripheral portion) 71a of the pointer image 71 on the periphery of the overlap portion 73a is displayed with the same brightness as that of the background 76 and with the same hue as that of the background 76.

For example, the pointer image 71 and the index image 73 are displayed in white color and the background 76 is black in color when the positions associated with the pointer image 7 and the index image 73 do not overlap. In this case, when the position associated with the pointer image 71 coincide with the position associated with the index image 73, the overlap portion 73a is displayed in white color and the peripheral portion 71a is displayed in the same black color as that of the background 76.

Since the index image 73 is displayed to overlap with the pointer image 71 at the overlap portion 73a, and the peripheral portion 71a of the pointer image 71 on the periphery of the overlap portion 73a is displayed in the same black color as that of the background 76, it is possible to read the index, such as the figure "4", indicated by the index image 73 by using the peripheral portion 71a as the background. Accordingly, the readability of the index indicated by the index image 73 increases.

In the above examples of the present embodiment, the pointer image 71, the index image 73, the overlap portion 73a and the background 76 are displayed in white and black without having hue and color saturation. Alternatively, the pointer image 71, the index image 73, the overlap portion 73a and the background 76 may be displayed in any cooler combinations including the hue and the color saturation. Further, the above examples of the pointer display mode of the present embodiment can be also employed to the speed meter image 8.

In the above discussed embodiments, the rotation meter image 7 and the speed meter image 8 are displayed in the form of meters in which the pointer images 71, 81 are displayed in rotation manner in accordance with increasing/decreasing of physical values such as, the engine rotational speed and the vehicle speed. However, the meter images and instrument images to which the pointer and index display modes of the above embodiments are employed is not limited to the above meter images.

Figure 19:
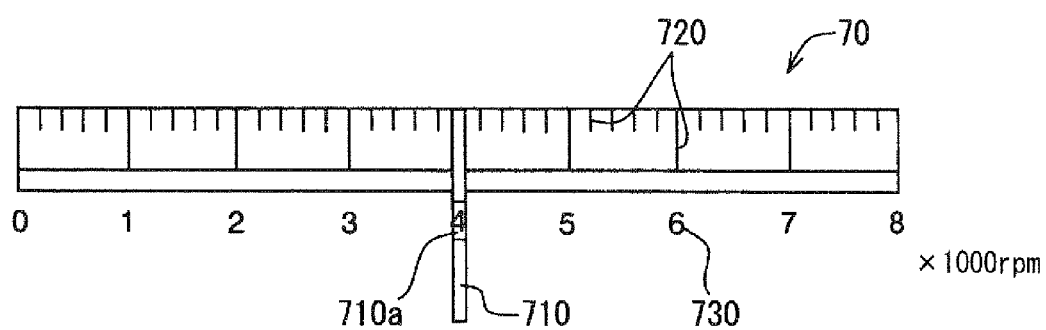
FIG. 19 is an enlarged front view showing a modification of a rotation meter image shown in FIG. 2.

For example, the pointer display mode and/or the index display mode of the above embodiments can be employed in a meter image or an instrument image in which a pointer image moves in a different manner as shown in FIG. 19. In an exemplary meter image 70 of FIG. 19, a scale image 720 and an index image 730 are linearly displayed, and a pointer image 710 is displayed to move in a horizontal direction (right-left direction in FIG. 19) in accordance with increasing/decreasing of an engine rotational speed. Also in this case, the aforementioned effect can be obtained. For example, a peripheral portion 710a of the pointer image 710 can be displayed similar to the peripheral portion 71a of the first embodiment. Moreover, the instrument image may be displayed such that the pointer image 710 moves in a vertical direction (upward/downward direction in FIG. 19).

In the above embodiments, when the pointer image 71 and the index image 73 do not overlap, that is, when the positions associated with the pointer image 71, 81, 710 and the index image 73, 83, 810 do not coincide, the pointer display mode and the index display mode are not varied.

In the above embodiments, the variations of the pointer display mode and the index display mode are employed to the rotation meter image 7, 70 in which the pointer image 71, 710, 711 rapidly moves. However, in a case where the pointer image moves rapidly, since the continuation time for the overlap display of the pointer image and the index image is made short, the time of achieving the feature of one aspect of the present invention may be limited to such a short continuation time. In a case where the continuation time of the overlap display is relatively long, the feature of the aspect of the present invention is more effectively achieved. For example, in a case of displaying a speed of zero in the speed meter image, in a case of displaying a speed of a constant speed running in an auto cruising control for performing the constant speed running on a highway or the like, in a case of displaying a clock image having at least a pointer and an index on a display panel such as a liquid crystal panel and the like, the feature of the aspect of the present invention can be effectively achieved.

In addition, the display panel 2 can be constructed of a monochrome liquid crystal panel without a full color display. Further, instead of the liquid crystal panel as a light receiving type (non-light emitting type) display panel, the display panel 2 can be constructed of an EL (electro/luminescence) display panel as a light emitting type display panel.

While only the selected exemplary embodiments have been chosen to illustrate the present invention, it will be apparent to those skilled in the art from this disclosure that various changes and modifications can be made therein without departing from the scope of the invention as defined in the appended claims. Further, the above embodiments will be combined in various ways. Furthermore, the foregoing description of the exemplary embodiments according to the present invention is provided for illustration only, and not for the purpose of limiting the invention as defined by the appended claims and their equivalents.

What is claimed is:

1. A vehicular instrument display device comprising:
a display panel for displaying an instrument image including an index image constituting an index and a pointer image constituting a pointer for pointing the index; and
a controller for displaying the instrument image on the display panel, wherein the controller varies at least one of a pointer display mode and an index display mode so as to increase readability of the index indicated by the index image when positions associated with the index image and the pointer image coincide; and wherein the controller varies the index display mode such that a plurality of supplementary images are displayed on a periphery of the index image so as to increase readability of the index indicated by the index image; and the controller displays each said supplementary image with a central brightness and hue between a brightness and hue of the pointer image and a brightness and hue of a background of said instrument image; and the controller displays said index image and pointer image with the same brightness and hue when said pointer image coincides with said index image; and wherein the plurality of supplementary images are added to only one side of each of one or more boundaries of said index image and wherein said index image is not fully enclosed by said boundaries when said pointer image coincides with said index image.

2. A vehicular instrument display device comprising:

a vehicle display panel configured to display an instrument image to a vehicle driver including an index image and a pointer image on a display background, which pointer image moves to sometimes point to and intersect the index image while leaving a non-overlapped portion of the index image on at least one side of the pointer image displayed in the background; and a controller configured to control the display panel to display the instrument image, wherein:

the controller is configured to provide an overlap display when positions associated with the index image and the pointer image coincide and where said non-overlapped portion of the index image continues to be displayed on the background, the overlap display being provided so that white the pointer image is displayed as continuous in its longitudinal direction, the pointer image has a predetermined peripheral portion display section on a periphery of the index image overlapped with the pointer image and on opposite sides of the index image with respect to a longitudinal direction of the pointer image, and at least one of hue and brightness of (a) the index image, (b) the predetermined peripheral portion display section of the pointer image, (c) the remainder of the pointer image, and (d) the background are all displayed differently from each other so that the entirety of the pointer image is distinctively displayed with respect to both the index image and the background image.

3. The vehicular instrument display device according to claim 2, wherein the predetermined peripheral portion display section of the pointer image has a brightness between that of the background and that of the remainder of the pointer image.

4. The vehicular instrument display device according to claim 2, wherein the predetermined peripheral portion display section of the pointer image has a hue between that of the background and that of the remainder of the pointer image.

5. The vehicular instrument display device according to claim 2, wherein the predetermined peripheral portion display section of the pointer image has substantially a middle brightness between that of the background and that of the remainder of the pointer image.

6. The vehicular instrument display device according to claim 2, wherein the predetermined peripheral portion display section of the pointer image has substantially a middle hue between that of the background and that of the remainder of the pointer image.

7. The vehicular instrument display device according to claim 2, wherein a brightness of the predetermined peripheral portion display section of the pointer image gradually varies from opposite ends of the predetermined peripheral portion display section toward a center thereof from a brightness of the remainder of the pointer image to a brightness of the background.

8. The vehicular instrument display device as in claim 2, wherein an outline of the pointer image adjoins an outline of the index image when the overlap display is provided.

9. A vehicular instrument display device comprising:

a vehicle display panel and an associated controller connected thereto configured to display an instrument image to a vehicle driver including an index image and an elongated pointer image on a display background, wherein at least one of the pointer and index images is movable relative to the other to create an overlap display when and where the pointer and index images overlap each other while leaving a non-overlapped portion of the index image on at least one side of the pointer image displayed in the background, wherein said overlap display comprises:

a peripheral portion overlap section of the elongated pointer image displayed with at least one of its hue and brightness being substantially different from that of at least one remaining non-overlapped adjacent portion of the pointer image while the pointer image continues to be displayed as being continuous in its longitudinal direction; and the overlapped index image displayed with at least one of its hue and brightness being substantially different from that of said section of the elongated pointer and where a non-overlapped portion of the index image continues to be displayed on the background, wherein (a) the peripheral portion overlap section of the pointer image, (b) the remainder of the pointer image, (c) the index image, and (d) the background are each displayed differently from one another in at least one of hue and brightness, so that the entirety of the pointer image is distinctively displayed with respect to the index image and the background in at least one of hue and brightness.

10. The vehicular instrument display device as in claim 9, wherein the overlapped index image is displayed in its entirety with substantially the same hue and brightness as other non-overlapped index images also concurrently displayed within said instrument image.

11. The vehicular instrument display device as in claim 9, wherein said peripheral portion overlap section of the elongated pointer image is displayed with changes in at least one of hue and brightness as a function of distance within said section.

12. The vehicular instrument display device as in claim 9, wherein an outline of the pointer image adjoins an outline of the index image when the overlap display is provided.

* * * * *